United States Patent
Donepudi et al.

(10) Patent No.: US 11,153,933 B2
(45) Date of Patent: *Oct. 19, 2021

(54) DYNAMIC MULTI-ACCESS WIRELESS NETWORK VIRTUALIZATION

(71) Applicant: Parallel Wireless, Inc., Nashua, NH (US)

(72) Inventors: Sridhar Donepudi, Nashua, NH (US); Sumit Garg, Hudson, NH (US); Kaitki Agarwal, Westford, MA (US); Rajesh Kumar Mishra, Westford, MA (US); Steven Paul Papa, Windham, NH (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/688,292

(22) Filed: Nov. 19, 2019

(65) Prior Publication Data

US 2020/0092948 A1 Mar. 19, 2020

Related U.S. Application Data

(63) Continuation of application No. 15/169,274, filed on May 31, 2016, now Pat. No. 10,485,058, which is a
(Continued)

(51) Int. Cl.
| | |
|---|---|
| *H04W 88/10* | (2009.01) |
| *H04W 84/18* | (2009.01) |
| *H04L 12/24* | (2006.01) |
| *H04L 29/08* | (2006.01) |
| *H04W 36/00* | (2009.01) |

(Continued)

(52) U.S. Cl.
CPC ............ *H04W 88/10* (2013.01); *H04L 41/12* (2013.01); *H04L 67/2842* (2013.01); *H04W 36/0022* (2013.01); *H04W 64/003* (2013.01); *H04W 84/18* (2013.01); *H04W 36/14* (2013.01); *H04W 60/00* (2013.01)

(58) Field of Classification Search
CPC . H04L 41/12; H04L 67/1004; H04L 67/2842; H04W 28/26; H04W 36/0022; H04W 36/14; H04W 60/00; H04W 64/003; H04W 84/18; H04W 88/10; H04W 60/04; H04W 68/00; H04W 72/1215; H04W 84/12
See application file for complete search history.

(56) References Cited

U.S. PATENT DOCUMENTS

| | | | |
|---|---|---|---|
| 2009/0300169 A1* | 12/2009 | Sagar | H04L 43/00 709/224 |
| 2013/0201847 A1* | 8/2013 | Chincholi | H04W 84/18 370/252 |

(Continued)

*Primary Examiner* — Kan Yuen
(74) *Attorney, Agent, or Firm* — Michael Y. Saji; David W. Rouille

(57) ABSTRACT

We disclose systems and methods of dynamically virtualizing a wireless communication network. The communication network is comprised of heterogeneous multi-RAT mesh nodes coupled to a computing cloud component. The computing cloud component virtualizes the true extent of the resources it manages and presents an interface to the core network that appears to be a single base station.

19 Claims, 7 Drawing Sheets

Related U.S. Application Data continuation of application No. 14/034,915, filed on Sep. 24, 2013, now Pat. No. 9,491,801.

(60) Provisional application No. 61/724,963, filed on Nov. 10, 2012, provisional application No. 61/724,964, filed on Nov. 10, 2012, provisional application No. 61/724,312, filed on Nov. 9, 2012, provisional application No. 61/718,503, filed on Oct. 25, 2012, provisional application No. 61/705,440, filed on Sep. 25, 2012.

(51) Int. Cl.
*H04W 64/00* (2009.01)
*H04W 36/14* (2009.01)
*H04W 60/00* (2009.01)

(56) References Cited

U.S. PATENT DOCUMENTS

| | | |
|---|---|---|
| 2014/0241316 A1 | 8/2014 | Okimyanskiy et al. |
| 2015/0173011 A1 | 6/2015 | Das et al. |

* cited by examiner

DYNAMIC MULTI-ACCESS WIRELESS NETWORK VIRTUALIZATION

CROSS-REFERENCE TO RELATED APPLICATIONS

This application is a continuation of, and claims the benefit of an earlier filing date under 35 U.S.C. 120 based on U.S. patent application Ser. No. 15/169,274, having filed May 31, 2016, entitled "Dynamic Multi-Access Wireless Network Virtualization," which itself is a continuation of, and claims the benefit of an earlier filing date under 35 U.S.C. 120 based on, U.S. patent application Ser. No. 14/034,915, having filed Sep. 24, 2013, entitled "Dynamic Multi-Access Wireless Network Virtualization," U.S. Pat. No. 9,491,801, which itself claims priority to the following U.S. Provisional patent applications: U.S. Provisional Patent Application No. 61/705,440, entitled "Multi-Access and Backhaul Wireless Systems and Methods" filed on Sep. 25, 2012; U.S. Provisional Patent Application No. 61/718,503 entitled "Software Defined Networking Approach for Wireless Base Station with Backhaul," filed on Oct. 25, 2012; U.S. Provisional Patent Application No. 61/724,312 entitled "Method of Optimizing Paging over LTE Radio," filed on Nov. 9, 2012; U.S. Provisional Patent Application No. 61/724,963 entitled "Multi Access Wireless Systems Virtualization Methods," filed on Nov. 10, 2012; U.S. Provisional Patent Application No. 61/724,964 entitled "Multi Access Wireless Systems Virtualization Methods," filed on Nov. 10, 2012, the entire contents of which are hereby incorporated by reference, each in its entirety for all purposes, having attorney docket numbers PWS-71700US00, 71702US00, 71703US00, 71705US00, and 71704US00, respectively.

FIELD

The present application relates to wireless broadband communication systems, cellular systems, small cells, and network virtualization.

BACKGROUND

The concept of virtualization can be defined broadly as a methodology by which an underlying resource is shared across multiple consumers, while providing each of the consumers with the illusion of owning the entire resource independent from the other consumers. Virtualization can be applied across both wired and wireless networks. In the wireless realm, virtualization has been done on IP networks and in wireless communication networks. Even within these two categories, there are various types of virtualization. For example, for IP networks, U.S. Patent Publication No. 2013/0094486 entitled "Wireless Network Virtualization for Wireless Local Area Networks" describes an access point for air-time guarantees to a group of clients who share an access point.

In another IP network patent application, WO 2011/144538 A1 entitled "Method and System for Network Virtualization," the inventors discuss sharing a common network infrastructure by splitting it into several logical network instances, called "slices," composed of virtual node "slivers" and virtual links. The application describes how to isolate wireless resources coexisting at the same time to ensure minimal interference among the resources as well as controlling wireless resource utilization to ensure that one slice does not infringe on the resources of other slices.

As for wireless communication networks, U.S. Patent Application No. 2009/0170472 entitled "Shared Network Infrastructure" discloses a wireless communication network where "[v]irtualization can provide an abstraction layer that allows multiple virtual machines to execute in isolation from one another, side-by-side on the same physical machine." ¶69.

Although these versions of virtualization differ in the medium in which they are implemented, they nonetheless share the common point that they are a "one-to-many" type of virtualization. By "one-to-many," we mean a common set of hardware is shared by more than one client or subscriber. In a way, this type of arrangement is like multi-tenancy in a building—many people living in individual apartments within a single building infrastructure.

These prior are applications further embody multi-tenancy in the sense that the people who live within a certain building are always allocated the same amount of living space. For example, a tenant in a multi-tenancy building may rent a one bedroom apartment. If at some point in time, he has six relatives visiting from afar, he is still only allocated a one bedroom apartment. His increased demand for living space is of no moment in this model. As a result, his relatives will have to sleep on couches, the floor, wherever they can find space because the nature of a multi-tenancy model is static. It does not respond to changing environmental conditions, and there is no intelligence in a real-time sense associated with the allocation of resources.

To the extent that the prior art virtualization techniques encompass intelligent, real-time decision making, they most typically report alarms experienced within the system. These alarms alert clients within the network that network performance may be jeopardized, but they do not make dynamic decisions about how to respond to the alarm. In terms of pooled resources, some prior art virtualization techniques include the idea of pooled processing capabilities. But they do not include the idea of pooled resources. In the case of a heterogeneous, multi-RAT mesh network, there can be hundreds of pooled resources available for use depending upon network conditions.

Going back to the definition of virtualization, each of these "many" users believe that they have exclusive use and control of the one set of hardware. FIG. 1 is an example of how a prior art virtualized base station 100 may operate according to this definition of virtualization. The base station 100 is comprised of a single set of hardware components. Additionally, the prior art performs virtualization in a physical way, on the hardware. On that single set of hardware components, virtualization techniques are used such that AT&T and Verizon could unknowingly share the hardware components of this base station, each believing that it was the only network operator using the base station 100.

While this type of virtualization has the advantage of being able to efficiently utilize common hardware, it is a one-way street in terms of the perspective from which you view virtualization. Specifically, the each service provider sees the base station 100 as being dedicated to it exclusively. In that respect, the base station 100 is virtualized when looking from the core network toward the base station. In the opposite direction, however, from the base station 100 to the core network, there is no virtualization. And that is in some respects a function of the static nature of prior art virtualization. Resources on the base station 100 are statically partitioned in a multi-tenancy fashion, which means that any change in the network, e.g., capacity, operating conditions, latency experienced by one network operator, cannot be dynamically addressed. There is a need, therefore, to create a dynamic wireless communication network.

This need is felt in many different types of wireless communication networks. Historically, wireless communication has been performed on 3G or Wi-Fi networks using macro cells and access points for local Wi-Fi data delivery. Looking forward, the selection of networks available for wireless communication is increasing to include LTE, TV White Space, small cell solutions integrated within macro networks, and so forth. Base stations that support this heterogeneous network, which is a network that integrates multiple radio technologies, will require more sophisticated management techniques in order to handle the ever-increasing demands being placed on networks.

Focusing for example on LTE networks, LTE has been designed to support only packet-switched services, in contrast to the circuit-switched model of previous cellular systems. One of the goals of LTE is to provide seamless Internet Protocol (IP) connectivity between user equipment (UE) and the packet data network (PDN), without any disruption to the end users' applications during mobility. See generally "The LTE Network Architecture: A comprehensive tutorial," Strategic White Paper, Alcatel-Lucent.

While the term "LTE" encompasses the evolution of the Universal Mobile Telecommunications System (UMTS) radio access through the Evolved UTRAN (E-UTRAN), it is accompanied by an evolution of the non-radio aspects under the term "System Architecture Evolution" (SAE), which includes the Evolved Packet Core (EPC) network. Together LTE and SAE comprise the Evolved Packet System (EPS). Id.

EPS uses the concept of EPS bearers to route IP traffic from a gateway in the PDN to the UE. A bearer is an IP packet flow with a defined quality of service (QoS) between the gateway and the UE. Together, the E-UTRAN and EPC set up and release bearers as required by applications. Id. An EPS bearer is typically associated with a QoS. Multiple bearers can be established for a user in order to provide different QoS streams or connectivity to different PDNs. For example, a user might be engaged in a voice (VoIP) call, while at the same time performing web browsing or an FTP download. A VoIP bearer would provide the necessary QoS for the voice call, while a best-effort bearer would be suitable for the web browsing or FTP session. Id.

FIG. 2 shows the overall network architecture, including the network elements and the standardized interfaces. The core network (called EPC in SAE) is responsible for the overall control of the UE and establishment of the bearers. The main logical nodes of the EPC are: (1) PDN Gateway (P-GW); (2) Serving Gateway (S-GW); and (3) Mobility Management Entity (MME). Currently, wireless base stations, such as LTE eNodeB and its backhaul networking infrastructure are managed on a component by component basis.

As an example, if one eNodeB used three different microwave backhaul links, each would be dedicated to, and managed by, a different vendor. As a result, there would be three distinct sets of operator policies and networking policies that would have to be translated to three distinct configurations unique to the individual pieces of backhaul equipment. Similarly, on the access side, there are four major network operators in the US: AT&T, Verizon, Sprint, and T-Mobile. Each of these network operators deploys its own proprietary architecture similar to that shown in FIG. 2, but importantly, lacking in interoperability between the carriers. The term "eNodeB" is used within the art to denote a standard, as opposed to uncustomized LTE base station. We use this term throughout to have that meaning, which is distinct form our customized multi-RAT nodes. Our multi-RAT nodes can function as standardized LTE base stations, but they also have much wider functionality Packet core signaling volumes in the early deployments of large-scale LTE networks are significantly higher than in existing 2G/3G core networks. This is partly due to the flatter, all-IP architecture of LTE where the macro and metro cell is directly connected to the MME—the dedicated control plane element in the EPC. Analysis of field data from several large LTE network deployments found that an MME can experience a sustained signaling load of over 500-800 messages per user equipment (UE) during the normal peak busy hours and up to 1500 messages per user per hour under adverse conditions. See generally "Managing LTE Core Network Signaling Traffic," Jul. 30, 2013, Alcatel Lucent, www2.alcatel-lucent.com/techzine/managing-lte-core-network-signaling-traffic.

The rise in core signaling can also be attributed to an overall increase in network usage by LTE subscribers. In some large US metropolitan markets where LTE is available, network peak usage is as high as 45 service requests per UE per hour in peak busy hours. As LTE grows in popularity, signaling in the EPC will continue to rise, which increases the potential for control plane congestion and signaling storms if not properly managed. Id. Additionally, when small cells, which are becoming more ubiquitous, are added to the network, the EPC is called upon to manage 100 to 1000 times more cells. Some of the functions that the EPC has to manage for each small cell include: (1) providing backhaul links; (2) dynamically configuration; (3) power level management; (4) physical cell ID allocation; (5) signal management; and (6) increased handovers within the network because of the smaller transmit range of the small cells. Therefore, MNOs need to deploy a carrier-grade, next-generation MME/Serving GPRS Support Nodes (SGSNs) platform that not only has the capacity, scalability and CPU processing performance, but also the capability to intelligently manage this traffic to reduce overall core signaling.

Two examples of where signaling efficiencies can be gained by using virtualized networks are: (1) paging/tracking management procedures; and (2) handoff management. Turning first to paging/tracking, a UE goes into the IDLE mode when its radio connection is released. When the UE is in IDLE mode and it needs to be reached by the network, for example if it has an incoming call, LTE standards, as well as legacy standards, define a PAGING process for reaching the UE. Under these paging/tracking scenarios, a PAGE is sent on a control channel to all of the base stations in the last known tracking area for the UE.

When the core network was primarily composed of macro cells, there may have been 10 macros within a tracking area. In today's networks, the number of base stations within a tracking area can typically be 100 or more. That is because service providers are augmenting their networks by incorporating small cells that ultimately connect to the core network so they can keep pace with the increasing number of wireless communication users and the demands they put upon the network. Given the large number of macro cells and small cells existing in today's networks, the transmit cost to the EPC and the network generally can be very high if the EPC does not know exactly where the UE is at any given moment. As small cells become more integrated into existing networks, this transmit cost will only increase. At any given time within a particular tracking area, there are many, many UEs that are in IDLE mode. A subset of these will require PAGING at any given instant. It is advantageous, therefore, to design a method and apparatus for efficiently managing network resources with respect to PAGING.

Every eNodeB within the control of the EPC must coordinate with its EPC when it performs a handover of one of the UEs within its sector. When small cells are a part of the network, the number of handovers among these small cells increases as compared with macro cells because the coverage area for small cells is much less than for macros. Further taxing the system, each network operator has its own EPC. It is, therefore, desirable, from a network resources standpoint, to incorporate an aggregator node that could virtualize a portion, or all of the network so that, from the core network's perspective, it appears to be servicing only one eNodeB when in fact behind that eNodeB is a large network of multi-RAT nodes. The embodiments disclosed herein include an aggregator node, which we refer to as a "computing cloud."

SUMMARY OF THE INVENTION

Embodiments of this invention include methods, systems, apparatuses, and architecture designed to provide wireless services by virtualizing several radio access technologies into a single architecture controlled by an intelligent radio controller. One embodiment discloses a paging strategy for a virtualized wireless communication network connected to a packet core network. An additional embodiment discloses a method of handing over using network attachment information.

DEFINITIONS

Figure 1:
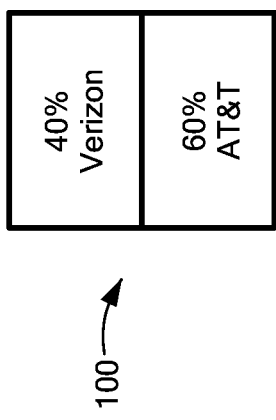
FIG. 1 is an illustration of a prior art virtualized base station.
Figure 2:
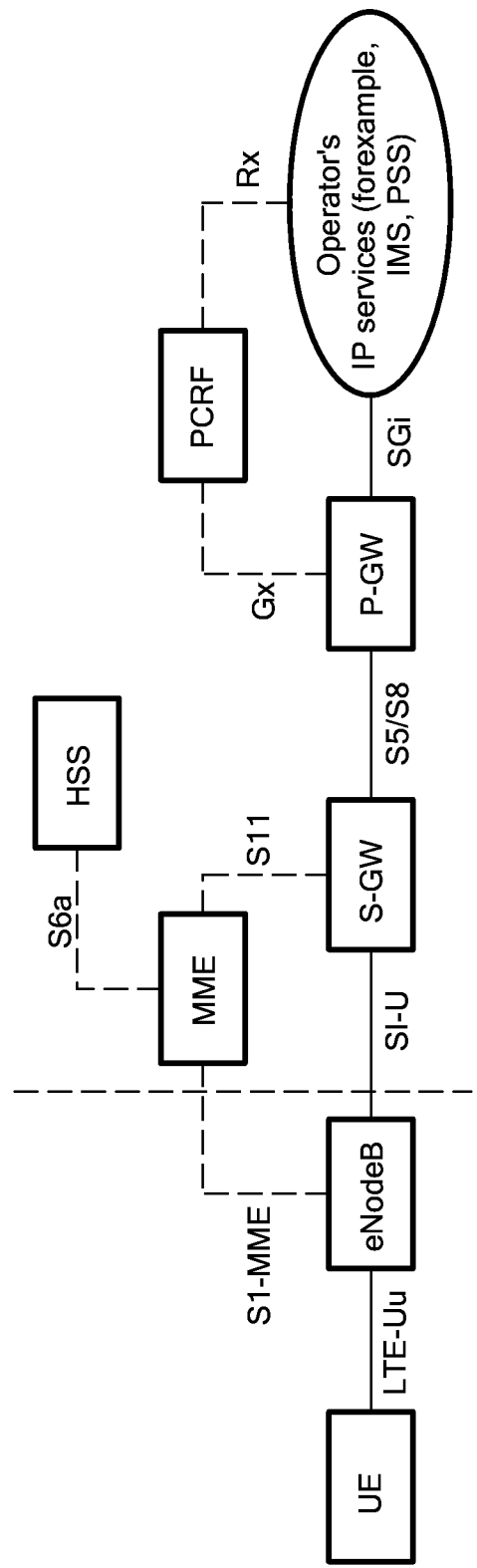
FIG. 2 is an illustration of prior art LTE network architecture.

The following definitions are included to supplement additional descriptions within the specification. These terms are to be interpreted as one skilled in the art would understand them.

Accelerator is a hardware device designed to speed up process, for example a web accelerator is a proxy server that speeds up website access.

eNodeB is an abbreviation for an E-UTRAN Node B. An eNodeB is an element in the E-UTRA, which is the air interface of 3GPP's Long Term Evolution "LTE." An eNodeB interfaces with the UE and hosts the PHYsical (PHY), Medium Access Control (MAC), Radio Link Control (RLC), and Packet Data Control Protocol (PDCP) layers. It also hosts Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers.

GTP-U is used for carrying user data within the general packet radio service "GPRS" core network and between the radio access network and the core network. The user data transported can be packets in any of IPv4, IPv6, or PPP formats. GTP-U protocol is used over S1-U, X2, S4, S5 and S8 interfaces of the Evolved Packet System (EPS). GTP-U Tunnels are used to carry encapsulated T-PDUs and signaling messages between a given pair of GTP-U Tunnel Endpoints. The Tunnel Endpoint ID (TED) which is present in the GTP header indicates which tunnel a particular T-PDU belongs to. The transport bearer is identified by the GTP-U TED and the IP address (source TED, destination TED, source IP address, destination IP address).

Heterogeneous mesh network means at least two dynamic mesh nodes capable of: using different protocols, or different duplexing schemes, or operating in disparate frequency bands, or using different transmit/receive mediums, such as wired versus wireless. Different protocols may include Wi-Fi, 2G, 3G, 4G, WCDMA, LTE, LTE Advanced, ZigBee, or Bluetooth. Different duplexing schemes may include time division, code division, and frequency division schemes. Disparate frequency bands may include so-called "whitespace," VHF and UHF channels, cellular telephony bands, public safety bands, and the like.

Iu proxy—a proxy is a server, which is a computer system or an application that acts like an intermediary for requests from clients seeking resources form other servers. A client connects to the proxy server, requesting some service, such as a file, connection, web page, or other resource available from a different server and the proxy server evaluates the request as a way to simplify and control its complexity. The Iu interface is an external interface that connects the RNC to the core network. An Iu proxy is therefore a proxy for the Iu interface.

MME is the acronym for mobility management entity. The MME is the key control node for the LTE access network. It is responsible for tracking and paging procedure including retransmissions, and also for idle mode of User Equipment (UE). MME is also involved in bearer activation and its deactivation procedures, to its task also belongs choosing the SGW for a UE in process of initial attach and when the intra-handover take place which involves Core Network (CN) node relocation. MME is responsible for authenticating user towards the HSS, if user is roaming MME terminates S6a. interface towards user's home HSS. All Non Access Stratum (NAS) signaling terminates at the MME point, which is also responsible for generation and allocation of temporary UE identities (GUT1). Among its duties is also authorization UE to Public Land Mobile Network (PLMN) and enforcing UE roaming restrictions if there are any. MME is also termination point of ciphering and integrity protection for NAS signaling. Lawful Interception (LI) of signaling could be also supported by MME entity. It also provides the control plane function for mobility between LTE and 2G/3G networks by the S3 interface from SGSN to MME). MME Functions include: NAS signaling; NAS signaling security; Inter CN node signaling for mobility between 3GPP access networks (terminating S3); UE Reach ability in ECM-IDLE state (including control and execution of paging retransmission); Tracking Area list management; Mapping from UE location (e.g. TAI) to time zone, and signaling a UE time zone change associated with mobility, PDN GW and Serving GW selection MME selection for handovers with MME change, SGSN selection for handovers to 2G or 3G 3GPP access networks; Roaming (S6a towards home HSS); Authentication; Authorization; Bearer management functions including dedicated bearer establishment; Lawful Interception of signaling traffic; Warning message transfer function (including selection of appropriate eNodeB); UE Reach ability procedures.

PGW is a packet data network "PDN" Gateway, and can also be called a PDN GW. The PGW provides connectivity to the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful Interception and packet screening.

Proxy is defined in the traditional sense as a computer system or an application that acts like an intermediary for requests from clients seeking resources form other servers. A client connects to the proxy server, requesting some service, such as a file, connection, web page, or other resource available from a different server and the proxy server evaluates the request as a way to simplify and control its complexity. We also use the term "proxy" to mean an aggregator or a back-to-back agent.

SDN controller is an application in software-defined networking ("SDN") that manages flow control to enable intelligent networking. SDN controllers are based on protocols, such as OpenFlow, that allow servers to tell switches where to send packets. The controller is the core of an SDN network. It lies between network devices at one end and applications at the other end. Any communications between applications and devices have to go through the controller. The controller also uses protocols such as OpenFlow to configure network devices and choose the optimal network path for application traffic.

SGW is the acronym for serving gateway. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW).

S1-GW is an acronym for an S1-gateway. S1-GW is a proprietary gateway that aggregates eNodeB communications with the core network. In a typical architecture, each eNodeB could talk directly to the EPC. In embodiments described herein, we aggregate those communications to virtualize all eNodeBs or all base stations into a single eNodeB or base station.

Upstream network device is an MME, SGW, or any hardware device that is part of the core network.

WAG/MAG is a wireless access gateway/mobility access gateway. The wireless access gateway ("WAG") provides interconnection between access and 3GPP networks. The WAG manages IP tunnels, QoS measurements, and it is responsible for roaming. The term TWAG, stands for trusted wireless access gateway. The mobility access gateway ("MAG") nodes provide the mobility agent function for mobility management, managing mobility of the mobile terminal with respect to the local mobility anchor ("LMA") and establishing and releasing a user-data transport tunnel for the IP address allocated by the Packet Data Network ("PDN").

X2 handover is a handover that occurs across an X2 interface. An X2 interface is a new type of interface introduced by the LTE Radio Access Network. It connects neighboring eNodeBs in a peer-to-peer fashion to assist handover and provide a means for rapid coordination of radio resources.

DETAILED DESCRIPTION

The virtualization embodiments disclosed herein are comprised of methods and computer-readable medium configured to execute these methods on a heterogeneous mesh wireless communication networks including a computing cloud as part of the network. Full details of the workings of the heterogeneous mesh network can be found in U.S. Patent application Ser. No. 13/889,631 filed on May 8, 2013 entitled "Heterogeneous Mesh Network and a Multi-RAT Node Used Therein," the entire contents of which are hereby incorporated by reference. Of note, when we discuss a heterogeneous mesh network, it is to be understood that there could be an unmeshed backhaul link within the network. The unmeshed backhaul link could be comprised of one or more wired connections to the computing cloud or to another network device. Similarly, there could be unmeshed wireless backhaul links that are part of the heterogeneous mesh network. These variations are changes in the network topology that one of skill in the art would understand how to do and that would not change the inventiveness of the embodiments disclosed herein.

Figure 3:
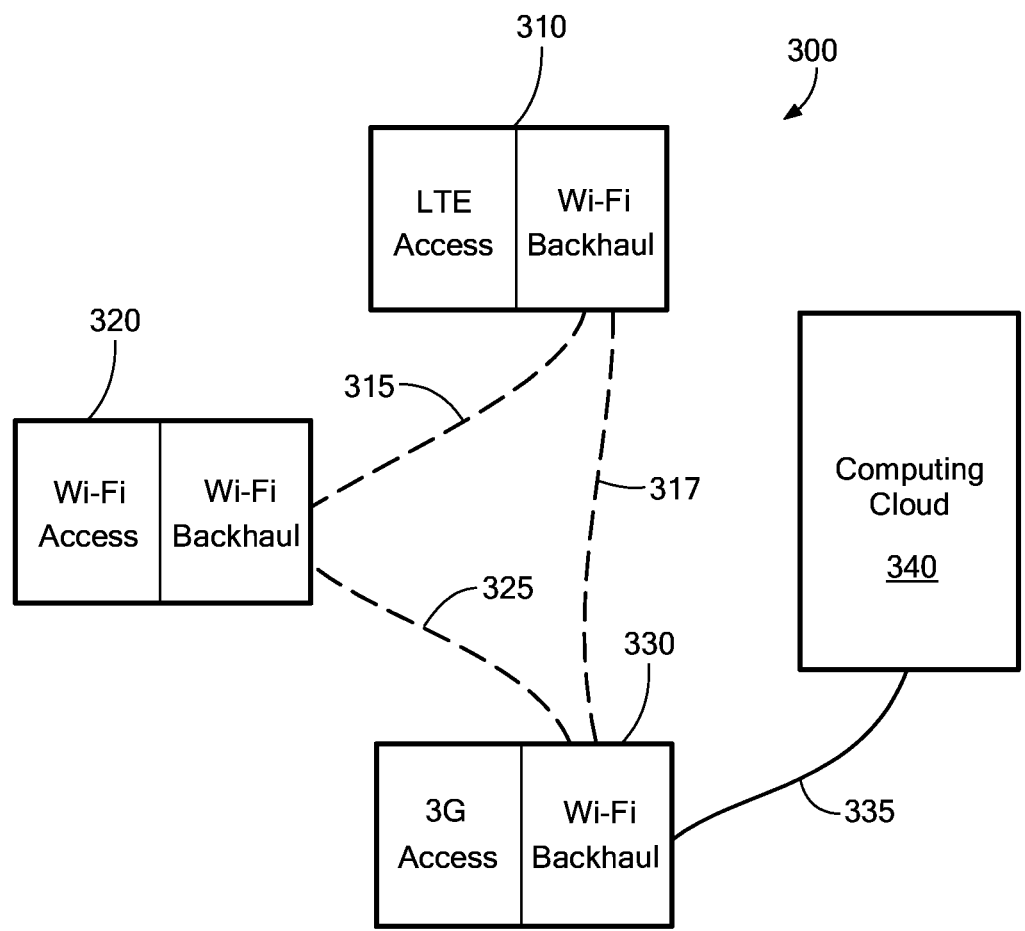
FIG. 3 is an illustration of a heterogeneous mesh network upon which embodiments of the present invention can be executed upon.

FIG. 3 depicts an exemplary heterogeneous mesh network 300 upon which the virtualization embodiments described herein can be executed. The heterogeneous mesh network 300 is comprised of three multi-radio access technology ("multi-RAT") nodes 310, 320, 330 and a computing cloud 340 component. By way of example, and without being limiting, each multi-RAT node 310, 320, 330 has an access radio and a backhaul radio. As can been seen from FIG. 3, the heterogeneous mesh network 300 includes multi-RAT nodes 310, 320, 330 with varied architecture. This varied architecture enables them to transmit and receive on myriad frequencies, protocols, duplexing schemes, and media access technologies. While each multi-RAT node 310, 320, 330 is depicted with only a single access radio and a single backhaul radio, in additional embodiments, these multi-RAT nodes 310, 320, 330 will have more than one access and/or backhaul radio. The backhaul connections 315, 317, 325 between the multi-RAT nodes 310, 320, 330 can be wireless in the heterogeneous mesh network 300. In one embodiment, multi-RAT node 330 can have a wired connection 335 to the computing cloud 340.

Figure 4:
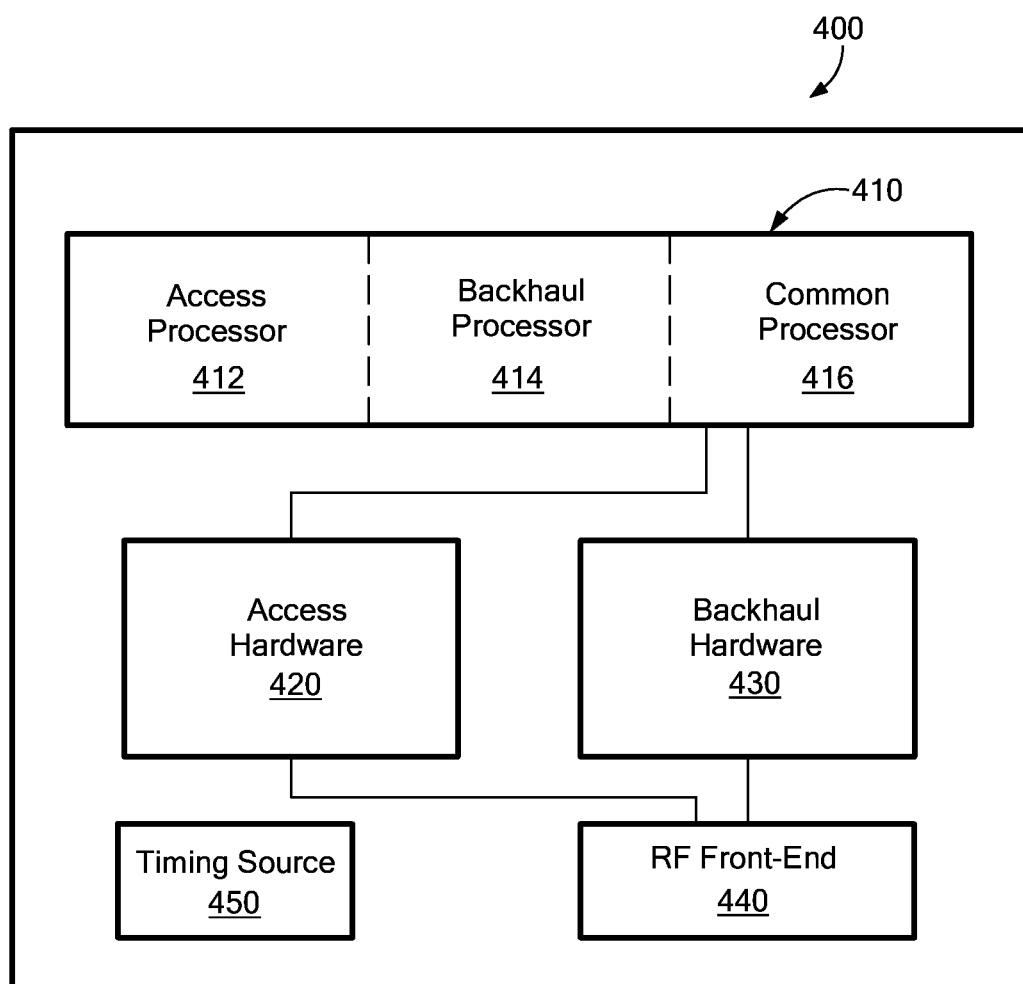
FIG. 4 illustrates the internal architecture of a multi-RAT node.

FIG. 4 illustrates the internal architecture of a multi-RAT node 400 used in the present virtualization embodiments. Multi-RAT node 400 is comprised of at least one processor 410, access hardware 420, backhaul hardware 430, an RF front-end 440, and a timing source 450. By way of example, the at least one processor 410 could contain firmware written in Linux. Additionally, the RF front-end 440 can be configured to provide RF capabilities for multiple radio access technologies. In one embodiment, the timing source could be GPS. Alternatively, the timing source could be derived from the Ethernet, or an IEEE 1588 source, such as SyncE, PTP/1588v2, and the like.

Referring again to FIG. 3, the computing cloud 340 component, or "computing cloud" for short, is comprised of software that is capable of being run on any general purpose server. The computing cloud 340 component, in some embodiments, can be a run on a secure, hosted cloud service, such as those offered by Citrix or Amazon. The computing cloud 340 component includes a memory for storing the computer readable methods of the disclosed embodiments. The memory may also store additional network information, such as routing tables, environmental conditions, operational parameters, and the like. The memory medium may also be a distributed memory medium, e.g., for security reasons, or in the situation where more than once computing cloud 340 is a part of the communication network data may be distributed among memory mediums within each computing cloud 340 component or even within the memory of multi-RAT nodes 310, 320, 330 that are part of the network. Also, the memory medium may be one of the networks to which the current network is coupled, e.g., a Storage Area Network, a Software Defined Network controller and the like. The computing cloud is further comprised of a processor and a network interface that facilitates communication with at least one multi-RAT node 310, 320, 330.

Figure 5:
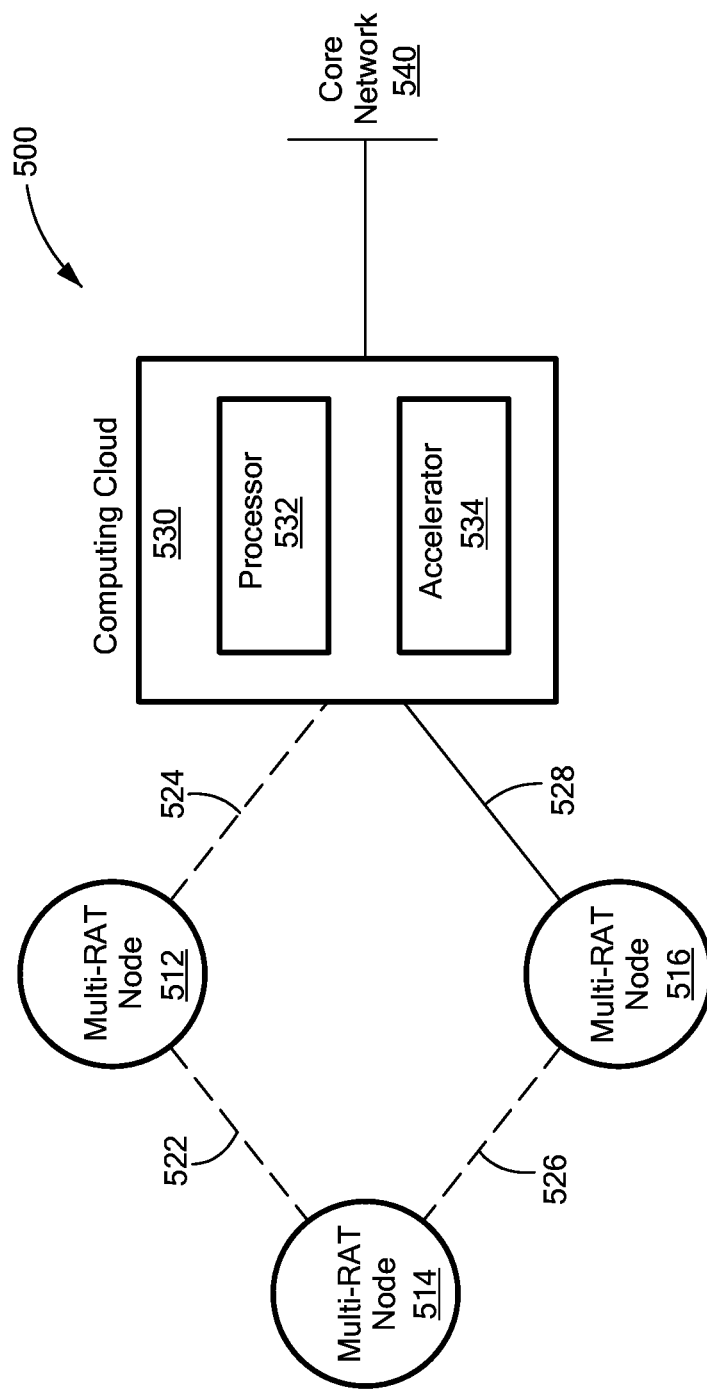
FIG. 5 is an illustration of an architecture of a computing cloud in embodiments of the present invention having 3G, LTE and Wi-Fi virtualized resources.

FIG. 5 illustrates a virtualized wireless communication network 500. This virtualized wireless communication network 500 includes multi-RAT nodes 512, 514, 516 communicatively coupled to a computing cloud 530. In the embodiment shown in FIG. 5, one of the multi-RAT nodes 516 has a wired connection 528 with the computing cloud, while another multi-RAT node 512 has a wireless connection 524 to the computing cloud. The third multi-RAT node 514 is communicatively coupled to the computing cloud 530 via its wireless connections 522, 526 to its neighbors, who are in-turn directly connected to the computing cloud 530. Although FIG. 5 shows three multi-RAT nodes 512, 514, 516 it is understood by those of skill in the art that a network could be created with as few as two multi-RAT nodes. Similarly, the connections 522, 524, 526 between the multi-RAT nodes 512, 514, 516 could be wired or wireless. As few as one multi-RAT node 512, 514, 516 within a network can be connected to the computing cloud 530 in these embodiments; and that connection could be wired or wireless, although a wired connection would be most reliable.

The computing cloud 530 is further comprised of a general purpose processor 532 and an accelerator 534. The processor 532 could be a central processing unit. Additionally, while only one processor 532 and one accelerator 534 are shown, it is understood by those skilled in the art that there could be more of one, the other, or both in the computing cloud 530. The computing cloud 530 is communicatively coupled to a core network 540, which believes that it is only connected to a single device, such as a single base station, rather than being connected to more than one multi-RAT node 512, 514, 516 on the other side of the computing cloud 530.

It is to be understood that the general architecture of the wireless communication network 500 is scalable and can be distributed because of the nature of the computing cloud 530. In terms of scalability, the wireless communication network 500 is scalable in at least two ways. First, although we show three multi-RAT nodes 512, 514, 516 coupled to the computing cloud 530, this architecture could support hundreds, thousands, many thousands, and millions, of multi-RAT nodes without overloading the core network.

Second, we show a single computing cloud 530. The computing cloud 530 component is also scalable, meaning there could be numerous computing clouds 530. Each of these additional computing clouds 530 could contain similar logic or the logic could be distributed. If the logic was distributed, the two or more computing clouds 530 could communicate with each other via an XML-based protocol. Some of the types of information that could be shared via this protocol are, for example, environmental conditions in each computing cloud's 530 respective network, the availability of additional resources to be shared if needed, a query from one computing cloud 530 to coordinate a handoff, and the like.

Figure 6:
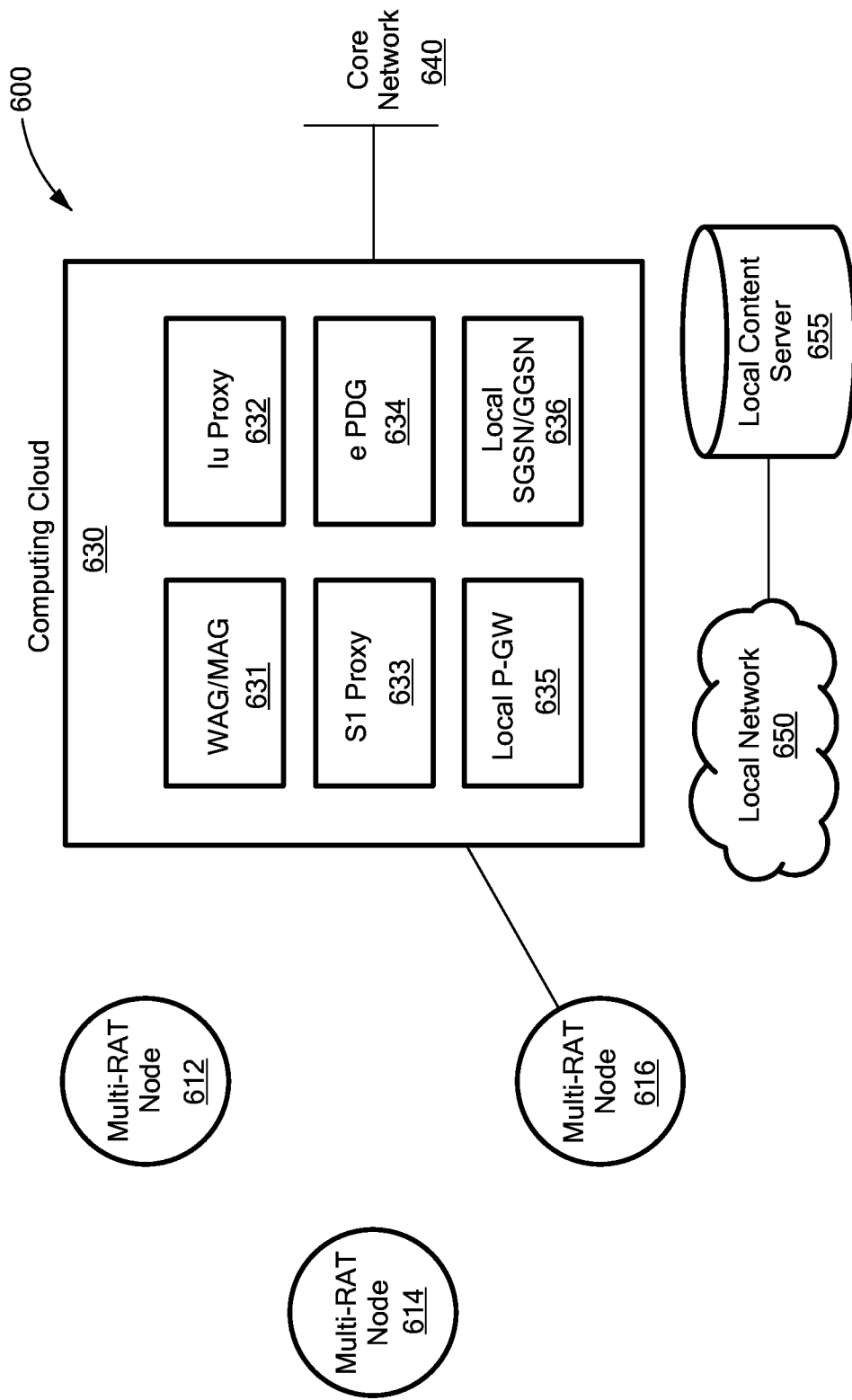
FIG. 6 is an illustration of the two-way nature of the virtualization systems and methods disclosed herein.

FIG. 6 shows a virtualized communication network 600 having exemplary radio technologies of: 3G, Wi-Fi and LTE. The choice of these radio technologies is illustrative only and not intended to limit the scope of the disclosure herein. The general functionality of the virtualized wireless communication network depicted in FIG. 6 is not intended to be different in a general sense from the functionality depicted in FIG. 5. Rather FIG. 6 shows a more specific implementation of a virtualized wireless communication network having three specific wireless technologies within the network: 3G, LTE, and Wi-Fi. In a different virtualized wireless communication network having different radio technologies, the specific internal contents of the computing cloud 630 would be altered to accommodate the wireless communication technologies operational within the network.

As can be seen from FIG. 6, the three multi-RAT nodes 612, 614, 616 are communicatively coupled to the computing cloud 630 via a wired connection from multi-RAT node 616 to the computing cloud 630. Inside of the computing cloud, there are specific processors and accelerators for LTE, shown as S1 proxy 633, Wi-Fi, shown as WAG/MAG 631, and 3G, shown as Iu proxy 632. The S1 proxy 633 in this embodiment is a software entity that virtualizes the existence of all of the LTE radios within the multi-RAT nodes 612, 614, 616 and facilitates handovers to and from LTE. In an alternate embodiment, the S1 proxy 633 could be further customized by adding proprietary extensions between the multi-RAT nodes 612, 614, 616 and the S1 proxy 633. We call this embodiment of the S1 proxy 633 an S1/S1' proxy because on one side of the proxy, it would be relating to the core network 640 in a standard S1 fashion, but on the other side of the proxy it would be interacting with the LTE portion of the multi-RAT nodes 612, 614, 616 in a non-standard way.

The Iu proxy 632 is a software entity that virtualizes the 3G radios in the multi-RAT nodes 612, 614, 616 and facilitates handovers to and from 3G. The Wireless Access Gateway/Mobile Access Gateway "WAG/MAG" 631 controls multiple access points, provides wireless connectivity, and facilitates handovers between Wi-Fi networks and LTE networks for the multi-RAT nodes 612, 614, 616. In additional embodiments of the WAG/MAG 631, it is possible that it could access data stored on the SIM card of a UE being serviced by a multi-RAT node 612, 614, 616 in order to authenticate the UE and allow it seamless connectivity to Wi-Fi access points.

ePDG 634 is a standards defined interworking function between PDN and untrusted non-3GPP standardized wireless interfaces such as Wi-Fi. FIG. 6 also includes two gateways, an LTE gateway 635 and a 3G/Wi-Fi gateway 636. These gateways 635, 636 are optional. In this embodiment, the gateways provide a connection to a local network 650 and a local content server 655. In the prior art, content and access to servers was typically performed at a regional or national data center, which was typically located a long distance away from most wireless networks. In this embodiment, we provide local network access 650 and a local content server 655 to reduce the traffic costs associated with accessing servers or content. In addition, local content could be shared with many users within a network. For example, local movie times, news, restaurants, social media, and the like could be available on local content server 655.

In alternate embodiments using similar architecture, the computing cloud 630 could contain a software module that allows it to perform deep-packet inspection. In these embodiments, the deep-packet inspection could be used to distinguish various data types, e.g., voice versus data, or video versus voice. This distinction, which can also be a QoS distinction, could be used to make radio bearer determinations, to choose an available network, to change data priority, and the like.

In the prior art, there was no need for gateways using different protocols to communicate with one another. For example, an MME would not have to communicate with a PDN. These devices were physically separate. In our virtualized embodiments, we connect with an MME and a PDN and other gateways in a virtualized manner. In the exemplary architecture of FIG. 6, we mimic a traditional LTE eNodeB with S1-proxy 633 and we host a TWAG 631 inside of the computing cloud 630. In the prior art, an ANDSF would make an initial bearer assignment for a data packet or a voice packet. This assignment was not dynamic, but rather was done as an initial matter. In the computing cloud 630 architecture, we have collocated a TWAG 631 and an S1-gateway, which is part of S1-proxy 633. This colocation allows us to make dynamic assignments, and most importantly reassignments of bearers on a variety of networks.

In addition, deep-packet inspection could be used to aggregate data in a "big data" sort of way. By this, we mean, data aggregation that can be used independent of a wireless communication network. One example of how big data can be used is to bookmark societal trends for regional marketing and the like.

In addition to deep-packet inspection, the computing cloud 630 can also perform content-caching. In this embodiment, the computing cloud 630 could determine the ten most popular YouTube clips on a real-time basis. The computing cloud 630 could use this determination and its content caching function to save local copies of these ten most popular YouTube videos on local content server 655. Those of skill in the art will recognize that computing cloud 630 could make this determination by noting the web traffic of UEs within its coverage area or within a larger area to the extent that the network has been scaled to include multiple computing clouds 630. Similarly, those of skill in the art will recognize that this type of content caching could apply to many different types of content including television shows, news articles, books, or any online content.

The computing cloud 630 also acts as a security gateway. It secures network traffic to the MME gateway and the S1-gateway by providing standard security protocols such as a VPN concentrator. Moreover, the computing cloud 630 has the intelligence to provide location-based service, such as weather, traffic, news, and the like.

The computing cloud 630 serves the function of pooling the resources of the virtualized wireless communication network 600. Each of the multi-RAT nodes 612, 614, 616 includes hardware for multiple radio technologies. The resources of the multi-RAT nodes are pooled so that the computing cloud 630 can efficiently allocate those resources in a real-time, dynamic fashion. All of this decision making and pooling of resources goes on behind the scenes, so to speak; and the core network 640 is unaware of how resources are allocated or that there is even more than one base station sitting behind the computing cloud 630. In some embodiments, the determination of how to most efficiently allocate radio resources can be accomplished using self-organizing, self-optimizing, self-healing methods known as "SON," and described more fully in U.S. patent application Ser. No. 14/024,717, entitled "Heterogeneous Self-Organizing Network for Access and Backhaul," filed on Sep. 12, 2013, the entire contents of which are hereby incorporated by reference.

The computing cloud 630 continually monitors environmental conditions such as signal-to-noise ratio, latency, etc. within the virtualized wireless communication network 600. It has a stored list of operating parameters, such as the various power levels of each multi-RAT node 612, 614, 616 the routing tables being used for data, the operational protocols and frequencies being used by each multi-RAT node 612, 614, 616 which can be altered dynamically to account for less than optimal environmental conditions such as high signal to noise ratio, high latency, or quality-of-service measures falling below a certain threshold. These environmental conditions are merely illustrative and not intended to be limiting.

The cloud component 630 can obtain myriad environmental condition measurements. Some of the environmental conditions regarding a heterogeneous mesh network include: an interference measurement, a capacity measurement, a spectrum efficiency measurement, routing path, a network congestion measurement, a throughput measurement, a latency measurement, a coverage gap, a signal-to-noise ratio, a quality-of-service measurement, a radio-bearer utilization value, an available portion of spectrum, a load balancing measurement, status of an operating heterogeneous mesh network, status of a multi-RAT node within the heterogeneous mesh network, identifying information regarding a multi-RAT node, status of a wired connection within the heterogeneous mesh network, a frequency restriction, a signal strength measurement of neighboring multi-RAT node, a request to join the heterogeneous mesh network, or the existence of a hidden node, and the like. Thus, unlike prior art virtualized node hardware, environmental condition measurements from multiple nodes within the virtualized communication network may be brought together in the cloud component, analyzed, and then be used to notify, control, adjust, or reconfigure one, more than one, or all consumers of the virtualized communication network.

In an alternate embodiment, the SON modules described herein could be harmonized with an external third-party network having its own set of environmental conditions and operational parameters. These third-party environmental conditions or third-party operational parameters could be any of the environmental conditions or operational parameters described herein with respect to the SON network. In these embodiments, an XML-based interface could facilitate communication between a computing cloud server or a multi-RAT node containing SON modules described herein and the third party network. When the SON module receives a third-party environmental condition or a third-party operational parameter, such as an operating frequency, it can adjust an operational parameter within its own internal network, for example, by altering the operating frequency of a multi-RAT node that may be experiencing interference related to its proximity to the third-party network. The harmonization between the SON networks described herein and third-party networks could serve to greater utilize resources between both the SON networks and the third-party networks by, for example, mitigating interference, coordinating handoffs, sharing unused spectrum, and the like.

Environmental conditions specific to multi-RAT nodes include: a multi-RAT node identification number, an identification number for software stored in a multi-RAT node, a security parameter, a location of a multi-RAT node, a configuration certificate of a multi-RAT node, an authentication request, an operating frequency, or a handoff request, and the like.

Environmental conditions relating to specific user equipment being serviced by multi-RAT nodes can also be measured and relayed to multi-RAT nodes within the mesh network. Some of these environmental conditions, which could also be processed by the disclosed SON embodiments, include: a range from a user equipment to a multi-RAT node, travel direction of a user equipment, a travel speed of a user equipment, a signal strength of a user equipment, a location of a user equipment, or a mapping application stored on a user equipment, an operational channel, and the like.

The aforementioned environmental conditions could be measured by a multi-RAT node 512, 514, 516. They could be calculated within a processor on a multi-RAT node 512, 514, 516 or on a processor 532 in a computing cloud 530. Similarly, they could be stored in cached memory within a multi-RAT node 512, 514, 516 or in a computing cloud 530 or distributed throughout the network.

Figure 7:
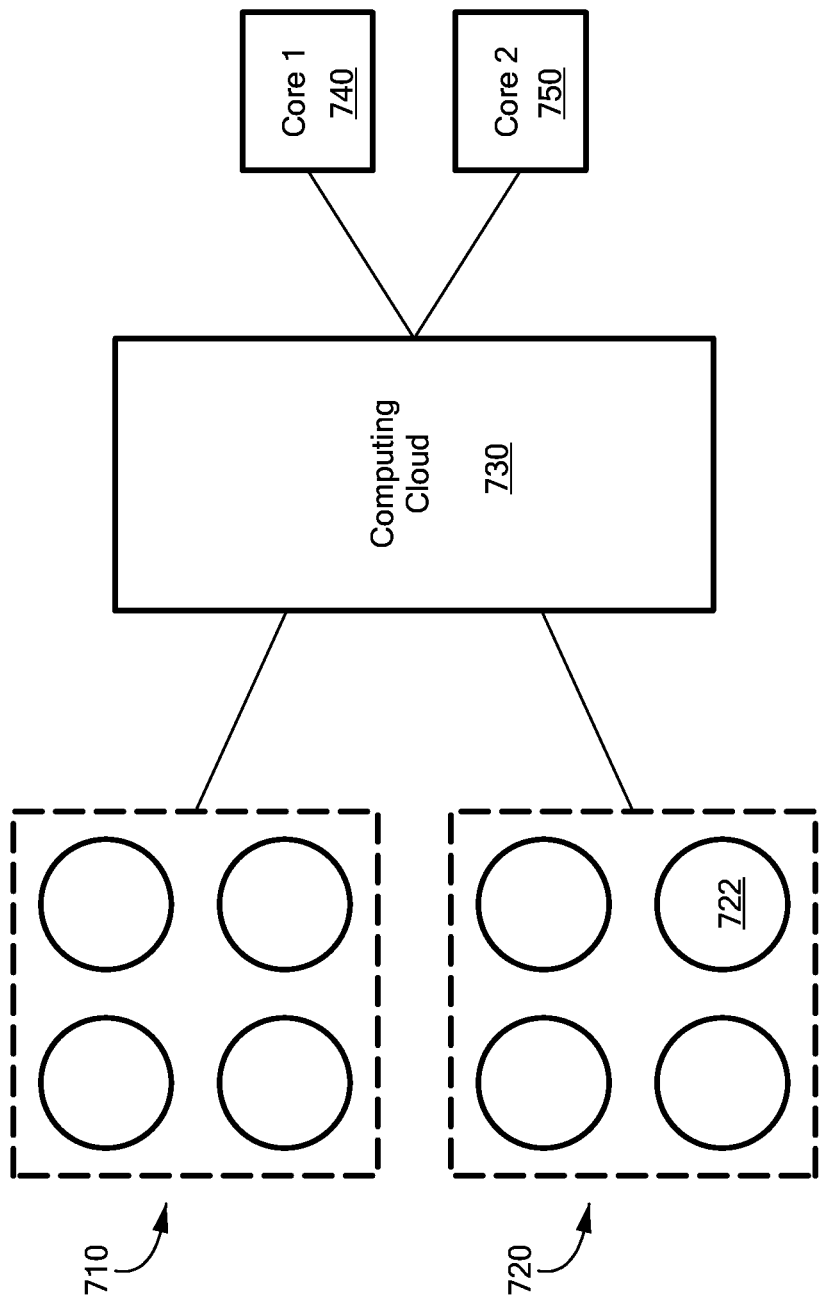
FIG. 7 illustrates the two-way nature of the virtualization of embodiments of this invention.

FIG. 7 illustrates the two-way nature of the virtualization of embodiments of this invention. The first type of virtualization is virtualization from the core network's perspective. FIG. 7 shows two wireless communication networks 710, 720 comprised of multi-RAT nodes 722. Both of the wireless communication networks 710, 720 are communicatively coupled to the computing cloud 730. Although FIG. 7 shows two separate connections to the computing cloud 730, communication network 710 could be communicatively coupled to communication network 720, which in turn could provide the communicative coupling for both networks to the computing cloud 730 in an alternate embodiment. Likewise, although FIG. 7 shows seven multi-RAT nodes, the number of nodes could be as small as two and can have no upper limit.

For purposes of illustration, FIG. 7 includes two core networks 740, 750. By way of example, one of the core networks 740 could be an AT&T network, and one of the core networks 750 could be a Verizon network. The virtualization methods and apparatuses disclosed herein create a dual, or two-way virtualization as follows. From the AT&T core network's 740 perspective, it sees its connection with the computing cloud 730 as a connection to a single base station. Similarly, from the Verizon core network's 750 perspective, it sees its connection with the computing cloud 730 as a single connection to a single base station. Neither of the core networks 740, 750 is aware of the other.

The communication data within the network has been abstracted as described more fully in U.S. patent application Ser. No. 13/889,631 filed on May 8, 2013 and entitled "Heterogeneous Mesh Network and a Multi-RAT Node Used Therein." As such, the data are agnostic with respect to frequency, protocol, duplexing scheme and media access technology. These abstracted data are not improperly multiplexed or coded with header information to indicate to the EPC or core network that multiple different radio technologies are being serviced. The signaling that transpires between the computing cloud 730 and the core network 740, 750 is the same type of signaling as would occur between a base station and the core network 740, 750 in some embodiments. In alternative embodiments, the signaling between the computing cloud 730 and the core network 740, 750 could be similar to the type of signaling that occurs between a base station and the core network 740, 750, if for example we were using an S1/S1' proxy and customized proprietary extensions between multi-RAT nodes and the S1/S1' proxy.

The second type of virtualization is from an individual multi-RAT node's 722 perspective. Multi-RAT node 722, which is part of a mesh network, is communicatively coupled to the computing cloud 730. The nature of a mesh network allows for dynamic adjustments to be made within the network. Computing cloud 730 oversees those dynamic adjustments by continually evaluating environmental conditions and operational parameters so as to be able to make dynamic changes within the network. Some of those changes could, for example, be a change from an LTE access channel to a white-space access channel in order for multi-RAT node 722 to improve its efficiency. In this situation, multi-RAT node 722 could be instructed by computing cloud 730 to switch its access radio to a white space radio. The computing cloud 730 could instruct multi-RAT node 730 as to which frequency to switch to within a white space sector. Before receiving this instruction, multi-RAT node 722 may have been unaware of the availability of a white space network, or which frequencies within the white space network were available. In that way, the networks to which the computing cloud 730 are connected are virtualized from any given multi-RAT node's 722 perspective. Moreover, unlike prior art virtualization methods, the frequencies within the white space network need not be dedicated or assigned exclusively to one consumer of the virtualized resource.

In alternate method embodiments of the present invention, we have created computer implemented methods of virtualizing a network so that the core network believes that the virtualized network is a single base station, when in fact the virtualized network is many base stations. In some ways, this is the inverse of the typical virtualization—the multi-tenancy version of virtualization. The computer implemented steps of the present invention could occur within a memory device stored on the computing cloud 340, 530, 630, or 730 or in a distributed fashion.

Figure 8:
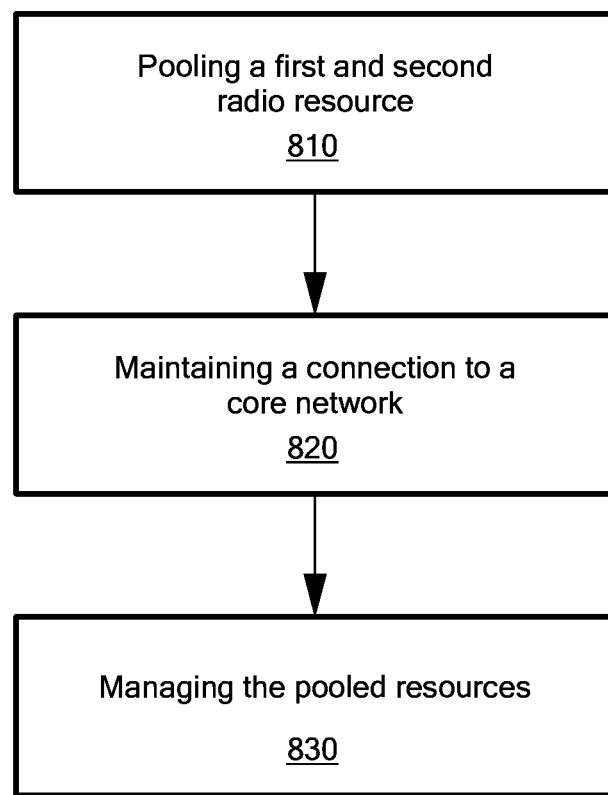
FIG. 8 illustrates a method of virtualizing a wireless communication network.

FIG. 8 shows these steps. In the first step, the computing cloud 340, 530, 630, or 730 pools 810 the radio resources of the multi-RAT nodes within a wireless communication network. In order to make a network, there has to be more than a single multi-RAT node actively participating within the network. In some embodiments, the multi-RAT nodes could have the same radio resources; and in other embodiments, their radio resources could be varied. For example, in one wireless communication network, there could be four multi-RAT nodes, each having a Wi-Fi radio and an LTE radio. The pooled resources would therefore be—four Wi-Fi radios and four LTE radios. In a different embodiment having four multi-RAT nodes, the pooled resources could be: two TV white space radios; three LTE radios, two Wi-Fi radios, and a 3G radio. In either of these embodiments, the pooled resources can be used for either access or backhaul.

In the next step of this method of virtualization, the computing cloud 340, 530, 630, or 730 maintains 820 a connection with a core network or an upstream device. The computing cloud 340, 530, 630, or 730 could establish a connection with a core network or an upstream network device and then maintain that connection. It could maintain multiple connections to multiple core networks or upstream devices as well.

The computing cloud 340, 530, 630, or 730 also in this method of virtualization manages 830 the pooled radio resources so that the core network or upstream network device believes that it has a single connection to a base station. The core network or upstream network devices unaware of how many radio resources are being managed 830 by the computing cloud, of the fact that radio resources have been pooled, etc. In the past, radio networks, operator policies, service agreements between service providers and their customers, differing operational parameters, and the like have resulted in the partitioning and segregation of radio resources. The virtualization embodiments described herein address these shortcomings.

Stepping behind the curtain of virtualization, one of the goals of the computing cloud 340, 530, 630, or 730 is to efficiently manage all of its pooled radio resources. This management can come into play at many different communication lifecycles that occur within a communication network. There is the establishment of a call or data connection. There is the continued maintenance of in-progress call or data session. There are handover decision, paging requests, backhaul requirements. There are environmental conditions as discussed above that continually affect network performance. There are equipment failures that affect performance. The computing cloud 340, 530, 630, or 730 takes these factors into consideration when it manages 830 the pooled radio resources.

In terms of the management of the radio resources, this management could be performed in several different ways. In one embodiment, a complete virtualization embodiment, multiple operators can completely share all the radio resources available. Radio resources are not reserved for any operator. Any subscriber of any operator may use all available radio resources at any time. In a second embodiment, split virtualization, the computing cloud 340, 530, 630, or 730 could store in a memory a list of dedicated radio resources reserved for each operator. If the radio resources dedicated for a particular operator are fully utilized, then a network attachment or a connection request from a subscriber belonging to that operator will be denied.

In a third embodiment, fair access virtualization, the computing cloud 340, 530, 630, or 730 could store in a memory a list of dedicated radio resources reserved for specific operators and a pool of unreserved radio resources. In this embodiment, if the radio resources for a particular operator were fully utilized, the computing cloud 340, 530, 630, or 730 could provide a radio resource for that operator from the pool of unreserved radio resources. In a fourth embodiment, unbalanced virtualization, the computing cloud 340, 530, 630, or 730 could provide dedicated radio resources to a subset of operators while also providing a pool of unreserved radio resources for the same or a different subset of operators, or for all operators.

In additional embodiments, the computing cloud 340, 530, 630, or 730 could manage 830 pooled radio resources by allocating a radio bearer in light of a quality of service value, a radio bearer resource utilization value, or other data priority metrics such as a data priority value, a data type, contractual relationships with network operators, or a service level agreement.

Call admission control may determine if a call request will be admitted or rejected based on the virtualized resources available per operator to guarantee the quality of service requested. If a call is accepted, the quality of service of existing calls may be maintained. Call admission control may use the virtualization embodiments described herein to admit or reject new calls.

Additional embodiments of the systems disclosed herein could include layered virtualization. In these embodiments, the basic architecture shown in FIG. 3 could be repeated N number of times, creating a total of N computing cloud servers 340, 530, 630, or 730. These N computing cloud servers 340, 530, 630, or 730 could include modules stored in internal memory that virtualize the total number of computing cloud servers, making it appear as though there is only one point of contact with the EPC, which appears to be an eNodeB or a base station. One advantage of these system embodiments is, from the core network's perspective, there is only one connection that requires management of metrics such as handoffs, paging, QoS measurements, billing, and the like. Additionally, using multiple clouds, on different networks, creates virtual redundancy. The resulting efficiencies include frequency reusability, maximization of network resources across multiple radio technologies, significant reduction in core management overhead, and the like.

The embodiments described herein reduce the system costs for handovers because the computing cloud 340, 530, 630, or 730 optimizes handovers between the pooled radio technologies. The computing cloud 340, 530, 630, or 730 keeps track of all handovers for each of the multi-RAT nodes within its network. When a UE moves from the coverage area of one multi-RAT node to another, the computing cloud 340, 530, 630, or 730 absorbs the mobility on the handoff side by sending all packets destined for that UE to the new multi-RAT node that is servicing the UE. These packets could include anchor data. Specifically, the computing cloud 340, 530, 630, or 730 replaces the traditional function of the MME with respect to the signaling between an MME and a traditional base station.

The multi-RAT nodes 612, 614, 616 of the embodiments described herein coordinate with the computing cloud 630 to perform handovers of UEs in a way that is invisible to the MME. These same benefits can be realized in networks that have been scaled to include large numbers of multi-RAT nodes or multiple computing clouds. By taking signaling to the MME out of the handoff scenario, the data traffic to the MME, and therefore over the core network, is greatly reduced. The computing cloud 630 has a global view of the loading experienced by each multi-RAT node 612, 614, 616 to which it is communicatively coupled. This global view allows the computing cloud 630 to achieve an optimal network load by selectively offloading cell edge UEs to neighbor cells by intelligent redirection as well as cell radius planning. Further, the computing cloud 630 can use TWAG activation to release LTE context in the MME and in a multi-RAT node 612, 614, 616. In these embodiments, the EPC does not have to be informed every time a handoff occurs, thereby greatly reducing the operational costs of the network.

The virtualization embodiments described herein also reduce operational costs of the network in terms of paging. Presently, when a UE is in idle mode and the core network must reach the UE, for example to connect a call, the core network sends a page to the UE. The core network typically sends a paging message to the base station last servicing the UE and perhaps to other base stations within the same tracking area as the UE's last active base station. If the UE cannot be located within close proximity to its last known location, the core network will start to broaden its search for the UE sending paging messages to a wider and wider audience of base stations.

These virtualization methods and systems lend themselves to a more precise way of locating a UE. In the virtualized embodiments described herein, the computing cloud 340, 530, 630, or 730 has more information about any particular UE than the core network or an upstream network device might have at any given moment in time. The computing cloud 340, 530, 630, or 730, because it is an aggregator node that sits between a multi-RAT mesh network and the core network, is privy to information related to any given UE's activities on other networks, such as Wi-Fi networks. If, for example, a particular UE was in IDLE mode on an LTE network, but was actively downloading content from a local server via a Wi-Fi connection, the computing cloud 340, 530, 630, or 730 would know when a page came in for that UE where it was located and which multi-RAT node should be paged. In this example, the computing cloud 340, 530, 630, or 730 could include a TWAG, which would enable it to use Wi-Fi attachment knowledge to more quickly locate a given UE. Similarly, if a UE was driving and it was using its GPS for navigation purposes, the computing cloud 340, 530, 630, or 730 would know where that UE was at any given moment. This type of heuristics paging could further reduce the tax placed upon the core network because the uncertainty inherent having the core network locate a UE in idle mode is reduced.

In the above-described embodiments, an SDN controller could be communicatively coupled to the computing cloud 340, 530, 630, or 730 server. In these embodiments, the SDN controller could push SDN policies into the virtualized network. The SDN controller could optionally be communicatively coupled to an external SDN controller, thereby acting like an SDN gateway to the virtualized network. In this embodiment, the SDN gateway could be implemented in proxy mode, passing along all control information to SDN controlled devices, or in hybrid mode, implementing some of its own policies on the control information it receives. In these SDN embodiments, the SDN controller(s) would also be virtualized from the perspective of the core network.

The foregoing discussion discloses and describes merely exemplary embodiments of the present invention. In additional embodiments, the methods described herein can be stored on a computer readable medium such as a computer memory storage, a compact disk (CD), flash drive, optical drive, or the like. Further, the computer readable medium could be distributed across memory storage devices within multiple servers, multi-RAT nodes, controllers, computing cloud components, and the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

What is claimed is:

1. A method for virtualization comprising:
   pooling a first radio resource of a first multi-RAT node with a second radio resource of a second multi-RAT node wherein the first and second multi-RAT nodes are communicatively coupled so as to form a network;
   managing the pooled resources so that an upstream network device interfaces with the pooled resources as a single base station;
   sharing the pooled resources with a plurality of mobile operators, wherein at least one of the pooled resources is reserved for a particular one of the plurality of mobile operators; and
   rejecting an attachment request or a connection request from a subscriber of the particular one of the plurality of mobile operators when the at least one of the pooled resources is fully utilized.

2. The method of virtualization of claim 1 further comprising storing anchor data in a memory device.

3. The method of virtualization of claim 1 further comprising choosing the first radio resource or the second radio resource from the pooled resources to perform a communication task based on an environmental condition.

4. The method of virtualization of claim 1 further comprising handing off a data transmission from the first radio resource to the second radio resource.

5. The method of virtualization of claim 4 wherein the handing off a data transmission from the first radio resource to the second radio resource is based upon an environmental condition.

6. The method of virtualization of claim 1 wherein the managing the pooled resource further comprises allocating a radio bearer by analyzing a quality of service value, a radio resource utilization value, or a data priority metric.

7. The method of claim 1, further comprising:
   dynamically inspecting a data packet;
   determining a data type of the data packet; and
   choosing the first or second radio resource based on the data type.

8. The method of claim 1 further comprising caching content on a local content server based on a characteristic of data traffic within the network.

9. The method of claim 1, wherein the first and the second radio resources are physical resource blocks (PRBs), and further comprising scheduling based on radio bearer utilization in the network.

10. The method of claim 1, further comprising performing scheduling based on radio conditions and radio bearer utilization of the pooled resources.

11. The method of claim 1, further comprising requesting handover, upon detection of backhaul utilization at a threshold at the first multi-RAT node, of a user equipment (UE) from the first multi-RAT node to the second multi-RAT node, the second multi-RAT node having radio resources to support a quality of service (QoS) requirement of the UE.

12. The method of claim 1, further comprising performing a handover from the first multi-RAT node to the second multi-RAT node across different radio access technologies.

13. The method of claim 1, further comprising:
   at the first multi-RAT node, maintaining a state machine per upstream network device, wherein the upstream network device is a mobility management entity (MME); and
   at the first multi-RAT node, establishing and managing stream control transmission protocol (SCTP) connections with a plurality of MMES.

14. A method for virtualization, comprising:
   pooling a first radio resource of a first multi-RAT node with a second radio resource of a second multi-RAT node wherein the first and second multi-RAT nodes are communicatively coupled so as to form a network;
   managing the pooled resources so that an upstream network device interfaces with the pooled resources as a single base station;
   sharing the capacity and traffic separation of the first multi-RAT node to control end-to-end quality of service (QoS) among a plurality of mobile operators; and
   performing sharing of the pooled resources at the computing cloud component, wherein the pooled resources are shared among a plurality of mobile operators, wherein the shared pooled resources appear uniquely associated to a particular mobile operator with a unique global eNodeB ID, and wherein the unique global eNodeB ID is formed of a public land mobile network (PLMN) ID of the mobile operator and eNodeB ID of a particular multi-RAT node of the pooled resources.

15. The method of claim 14, further comprising generating billing records based on a virtualization factor, the virtualization factor in proportion to use of the shared resources by each of the plurality of mobile operator.

16. The method of claim 14, further comprising:

each multi-RAT node of the pooled resources broadcasting the PLMN ID of each of the mobile operators of the plurality of mobile operators sharing the pooled resources, the broadcasting performed in a system information block (SIB);

sending, from the first multi-RAT node, the SIB;

receiving, from the user equipment (UE), a broadcast PLMN ID in a radio resource control (RRC) message, the PLMN ID selected by the UE; and sending, from the first multi-RAT node, an attachment request for the UE to a mobility management entity (MME), the MME being associated with the PLMN ID selected by the UE.

17. The method of claim 14, further comprising establishing a GPRS tunneling protocol (GTP) user data (GTP-U) tunnel between a multi-RAT node serving a user equipment (UE) and a destination service gateway in a core network associated with the UE, the core network being associated with a particular mobile operator.

18. A non-transitory computer-readable medium containing instructions that, when executed on a processor, cause the processor to perform steps comprising:

pooling a first radio resource of a first multi-RAT node with a second radio resource of a second multi-RAT node wherein the first and second multi-RAT nodes are communicatively coupled so as to form a network;

and managing the pooled resources so that an upstream network device interfaces with the pooled resources as a single base station sharing the pooled resources with a plurality of mobile operators, wherein at least one of the pooled resources is reserved for a particular one of the plurality of mobile operators; and rejecting an attachment request or a connection request from a subscriber of the particular one of the plurality of mobile operators when the at least one of the pooled resources is fully utilized.

19. A non-transitory computer-readable medium containing instructions that, when executed on a processor, cause the processor to perform steps comprising:

pooling a first radio resource of a first multi-RAT node with a second radio resource of a second multi-RAT node wherein the first and second multi-RAT nodes are communicatively coupled so as to form a mesh network;

managing the pooled resources so that an upstream network device interfaces with the pooled resources as a single base station;

sharing the capacity and traffic separation of the first multi-RAT node to control end-to-end quality of service (QoS) among a plurality of mobile operators; and performing sharing of the pooled resources at the computing cloud component, wherein the pooled resources are shared among a plurality of mobile operators, wherein the shared pooled resources appear uniquely associated to a particular mobile operator with a unique global eNodeB ID, and wherein the unique global eNodeB ID is formed of a public land mobile network (PLMN) ID of the mobile operator and eNodeB ID of a particular multi-RAT node of the pooled resources.

* * * * *